(12) United States Patent
Sagalov

(10) Patent No.: US 7,903,114 B2
(45) Date of Patent: Mar. 8, 2011

(54) APPARATUS AND METHOD FOR VISUALIZING THE RELATIONSHIP BETWEEN A PLURALITY OF SETS

(75) Inventor: Ellen Sagalov, Buffalo Grove, IL (US)

(73) Assignee: Business Objects Software Ltd., Dublin (IE)

( * ) Notice: Subject to any disclaimer, the term of this patent is extended or adjusted under 35 U.S.C. 154(b) by 0 days.

(21) Appl. No.: 12/624,262

(22) Filed: Nov. 23, 2009

(65) Prior Publication Data

US 2010/0207947 A1    Aug. 19, 2010

Related U.S. Application Data

(63) Continuation of application No. 11/537,588, filed on Sep. 29, 2006, now Pat. No. 7,623,129.

(51) Int. Cl.
*G06T 11/20* (2006.01)
(52) U.S. Cl. ........................................ 345/440
(58) Field of Classification Search .................. 345/440
See application file for complete search history.

(56) References Cited

U.S. PATENT DOCUMENTS

| 6,326,962 B1 | 12/2001 | Szabo |
| 2003/0182310 A1* | 9/2003 | Charnock et al. .......... 707/104.1 |
| 2005/0239111 A1 | 10/2005 | Van Rhee et al. |

OTHER PUBLICATIONS

Bette et al., "Venn Diagrams with Few Vertices", The Electronic Journal of Combinatronics, vol. 5 (1), #R44, p. 1-21, retrieved from the internet on Feb. 3, 2008 at <http://www.emis.de/journals/EJC/Volume_5/PDF/v5i1r44.pdf>.
Ruskey et al., "A Survey of Venn Diagrams: Graphs Associated with Venn Diagrams", The Electronic Journal of Combinatronics, Jun. 2005. Jun. 26, 2009 <http://www.combinatronics.org/Surveys/ds5/VennGraphicEJC.html>.
Stallman et al., "GDR: A Visualization Tool for Graph Algorithms", In Proceedings of Computational Support for Discrete Mathematics (1991).

* cited by examiner

*Primary Examiner* — Xiao M Wu
*Assistant Examiner* — Scott E Sonners
(74) *Attorney, Agent, or Firm* — Cooley LLP

(57) ABSTRACT

A computer readable storage medium includes executable instructions to associate two or more data sets with two or more vertices in a Venn graph. An intersection of the two or more data sets is associated with a vertex in the Venn graph. A plurality of outliers is associated between the two or more data sets and the intersection of the two or more data sets with a plurality of vertices disposed between the two or more vertices and the vertex in the Venn graph.

19 Claims, 9 Drawing Sheets

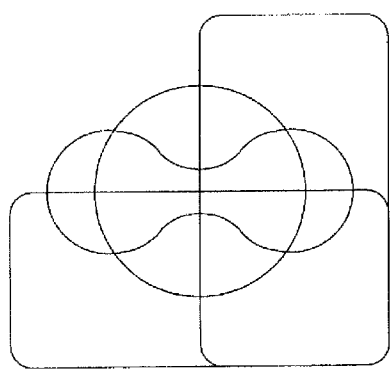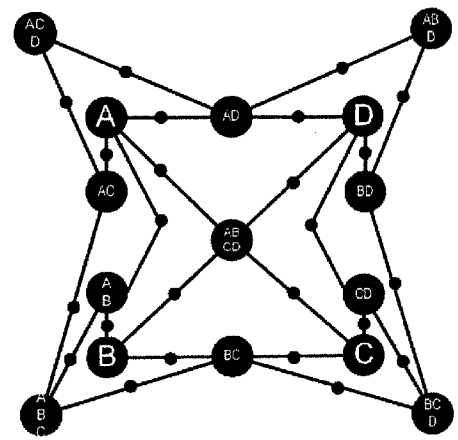
PRIOR ART
FIG. 16
FIG. 17

US 7,903,114 B2

APPARATUS AND METHOD FOR VISUALIZING THE RELATIONSHIP BETWEEN A PLURALITY OF SETS

CROSS REFERENCE TO RELATED APPLICATIONS

This application is a continuation of U.S. patent application Ser. No. 11/537,588 filed Sep. 29, 2006, now U.S. Pat. No. 7,623,129.

BRIEF DESCRIPTION OF THE INVENTION

This invention relates generally to visualization of data. More particularly, this invention relates to creating a visualization depicting the interrelationship and overlap of two or more sets of data.

BACKGROUND OF THE INVENTION

Business Intelligence (BI) generally refers to software tools used to improve business enterprise decision-making. These tools are commonly applied to financial, human resource, marketing, sales, customer and supplier analyses. More specifically, these tools can include: reporting and analysis tools to present information, content delivery infrastructure systems for delivery and management of reports and analytics, data warehousing systems for cleansing and consolidating information from disparate sources, and data management systems, such as relational databases or On Line Analytic Processing (OLAP) systems used to collect, store, and manage raw data.

A subset of business intelligence tools are Enterprise Information Management (EIM) tools. EIM tools include functions for maintaining and managing the quality of data. EIM tasks include data integration, data quality/cleansing (i.e., defect detection and correction), and metadata management. Other EIM tasks include data profiling, matching and enrichment. EIM tools are useful for organizations to asses the quality of their data and improve the quality thereof. Traditionally, a large part of EIM has been cleansing of customer data (e.g., names and addresses). The EIM tools can be used to profile the data to asses its quality. EIM can be used for product data and financial data. There are a number of EIM tools for the various EIM tasks. Such tools are available from Business Objects, San Jose, Calif.

The EIM task of data quality/cleaning includes the acts of defect detection and reporting on data quality. Data quality is measured in many ways including accuracy, currency, completeness, and consistency. The reports of data quality can be qualitative and quantitative. There are EIM tools with graphical interfaces and dashboard reports. These dashboard reports provide a snapshot of data quality task results showing a graphical summary of an analysis of the data.

There are known techniques for graphically portraying quantitative information. The techniques are used in the fields of statistical graphics, data visualization, and the like. Venn diagrams and graphs can be used to represent sets. Sets and intersections of sets have a logical mapping to Venn diagrams. Sets and their associations may be logically mapped to a graph and thereby facilitate data selection. These visualizations can be included in EIM tools, BI tools, report documents or other documents.

Existing Venn diagrams and graphs have limitations. One limitation of a Venn diagram is that showing the outliers to a set is difficult. There is no place in the visualization to logically map the outliers. Another limitation is that for large numbers of sets, association of two sets (i.e., their overlap) is difficult to depict.

In view of the foregoing, it would be highly desirable to provide improved techniques for the visualization of sets. It would also be desirable to enhance existing BI tools, including EIM tools, to facilitate improved reporting on data quality.

SUMMARY OF INVENTION

The invention includes a computer readable storage medium with executable instructions to associate two or more data sets with two or more vertices in a Venn graph. An intersection of the two or more data sets is associated with a vertex in the Venn graph. A plurality of outliers is associated between the two or more data sets and the intersection of the two or more data sets with a plurality of vertices disposed between the two or more vertices and the vertex in the Venn graph.

The invention also includes a computer readable storage medium with executable instructions to convert a Venn diagram into a temporary graph, create a dual graph from the temporary graph, remove a first vertex and a set of edges incident upon the first vertex from the dual graph, wherein the first vertex corresponds to the highest order intersection of the Venn diagram. A second vertex is replaced with the first vertex to create a new graph, wherein the second vertex represents the universe of the Venn diagram.

The invention also includes a computer readable storage medium with executable instructions defining a first plurality of vertices representing three or more data sets. A vertex represents an intersection of the three or more data sets, wherein the intersection is of a known integer order. A second plurality of vertices represents intersections of one or more orders between second order and one less than the known integer order. A first plurality of edges incident on the vertex represents an intersection of the three or more data sets, where the first plurality of edges couple the vertex representing the intersection of the three or more data sets to the first plurality of vertices. A second plurality of edges incident on vertices of the first plurality of vertices couple the vertices of the first plurality of vertices to vertices of the second plurality of vertices. A third plurality of vertices correspond to outliers, wherein each vertex in the third plurality of vertices is disposed between each vertex representing an original set and an intersection.

BRIEF DESCRIPTION OF THE FIGURES

The invention is more fully appreciated in connection with the following detailed description taken in conjunction with the accompanying drawings, in which:

FIGS. 12, 14 and 16 illustrate Venn diagrams for visualizing the relationship between sets in accordance with the prior art.

FIGS. 13, 15 and 17 illustrate graphs for visualizing the relationship between sets corresponding to the Venn diagrams of FIGS. 12, 14 and 16 in accordance with embodiments of the invention.

Like reference numerals refer to corresponding parts throughout the several views of the drawings.

DETAILED DESCRIPTION OF THE INVENTION

Figure 1:
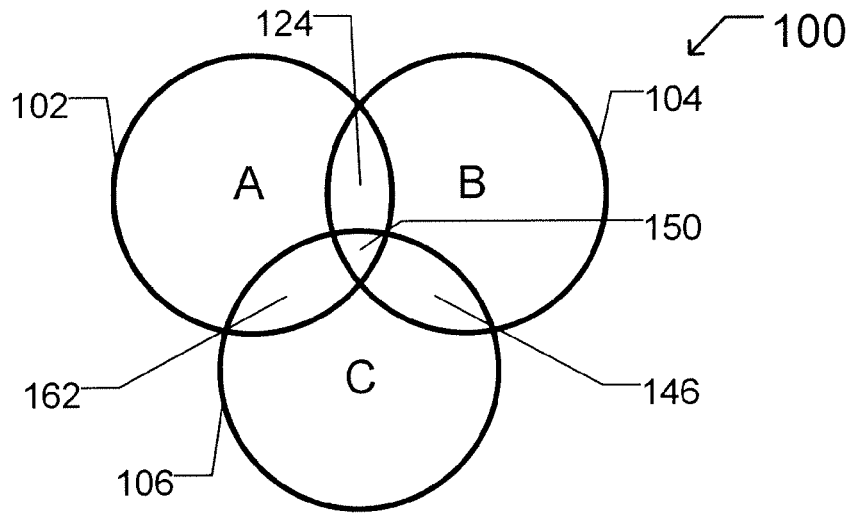
FIG. 1 illustrates a Venn diagram for visualizing the relationship between sets in accordance with the prior art.

Embodiments of the present invention use Venn diagrams and graphs. Venn diagrams are visualizations used to show the relationship between different sets. FIG. 1 illustrates a Venn diagram 100 for three sets 102, 104 and 106. The three sets 102, 104 and 106 are also respectively called A, B and C. The total combined area of sets A and B is called the union of sets A and B or A∪B. The area where the two sets A and B overlap is the intersection of A and B or A∩B. The intersection between set 102 and set 104 is intersection 124. The intersection between set 104 and set 106 is intersection 146. The intersection between set 106 and set 102 is intersection 162. The intersection between sets 102, 104 and 106 is intersection 150.

Figure 2:
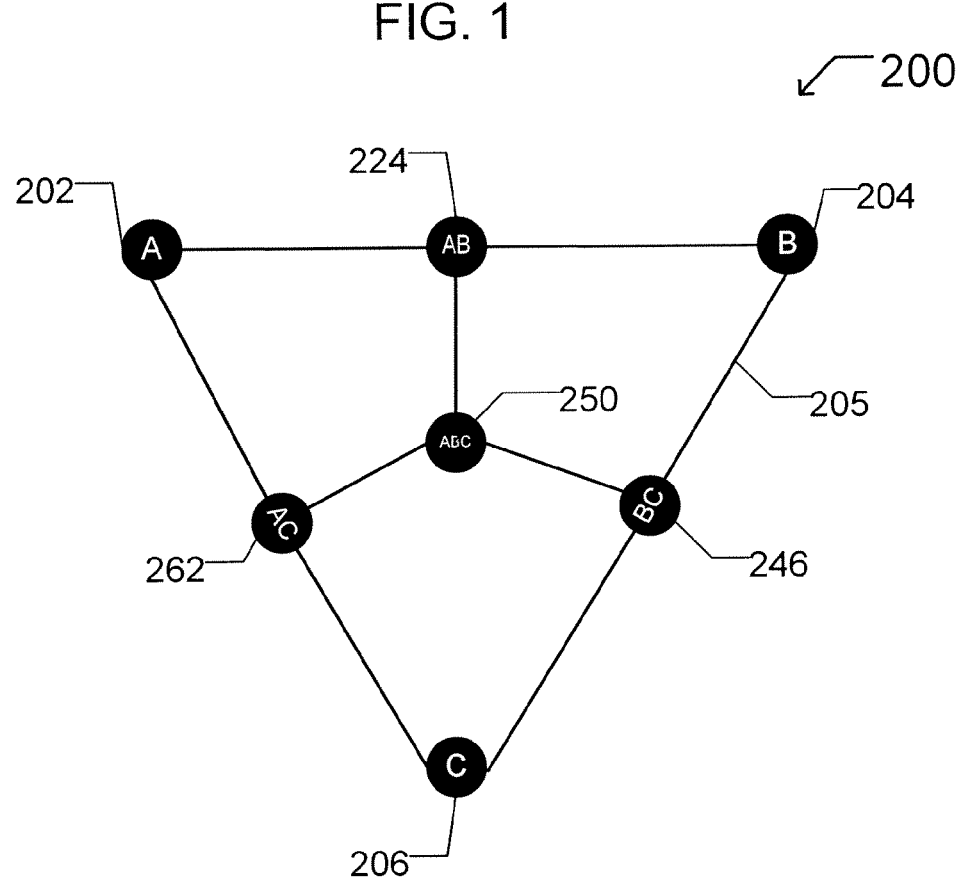
FIG. 2 illustrates a graph created from the Venn diagram of FIG. 1 in accordance with a procedure from the prior art.

FIG. 2 illustrates a graph. A graph may be defined by its vertices (e.g., 202, 204, 206, 224, 246, 262 and 250, collectively denoted V), and its edges (e.g., (202, 224), (202, 262), (224, 204), (224, 250), (204, 246), (250, 262), (250, 246), (262, 206) and (246, 206), collectively denoted E). A graph G is then defined as G=(V, E). An individual vertex is labeled by its name and an individual edge is labeled by its name (e.g., 205) or the vertices at its termini (e.g., 204, 246). Graph 200 is constructed from Venn diagram 100 by the well known procedure of geometric dual graph construction. First, the intersections of set boundaries in Venn diagram 100 are replaced with vertices. These vertices are connected by edges formed directly from the set boundaries. This is a temporary graph. Then, the enclosed areas within the edges, called faces, are each assigned a new vertex. These new vertices were connected to each other by new edges. That is, one new edge is inserted between each pair of new vertices, often crossing the old edges at right angles. The conversion of Venn diagram 100 to graph 200 has the following isomorphisms:

| Venn Diagram 100 | Graph 200 |
|---|---|
| set 102 | vertex 202 |
| set 104 | vertex 204 |
| set 106 | vertex 206 |
| set 124 | vertex 224 |
| set 146 | vertex 246 |
| set 162 | vertex 262 |
| Set boundaries. | Orthogonal edges to set boundaries connecting vertices. |

Graph 200 is planar. A planar graph is a graph that can be drawn in a plane so that no edges intersect. The temporary graph is planar. The geometric dual of a planar graph is known to be a planar graph. Graph 200 is the geometric dual of the temporary graph.

In accordance with embodiments of the present invention, a business intelligence tool presents data as a graph rather than a Venn diagram. Embodiments of the present invention include graphs which facilitate the storage, display and manipulation of data amenable to storage in a Venn diagram. These graphs are used in accordance with the profiling aspect of data quality. The graph displays how various sets (e.g., data sources, columns is a database table) interrelate. Embodiments of the invention include graphs that depict overlapping data sets and outliers to the overlap. These graphs are a compact representation of how data sets interrelate and therefore are a desirable feature of EIM and BI tools.

Figure 3:
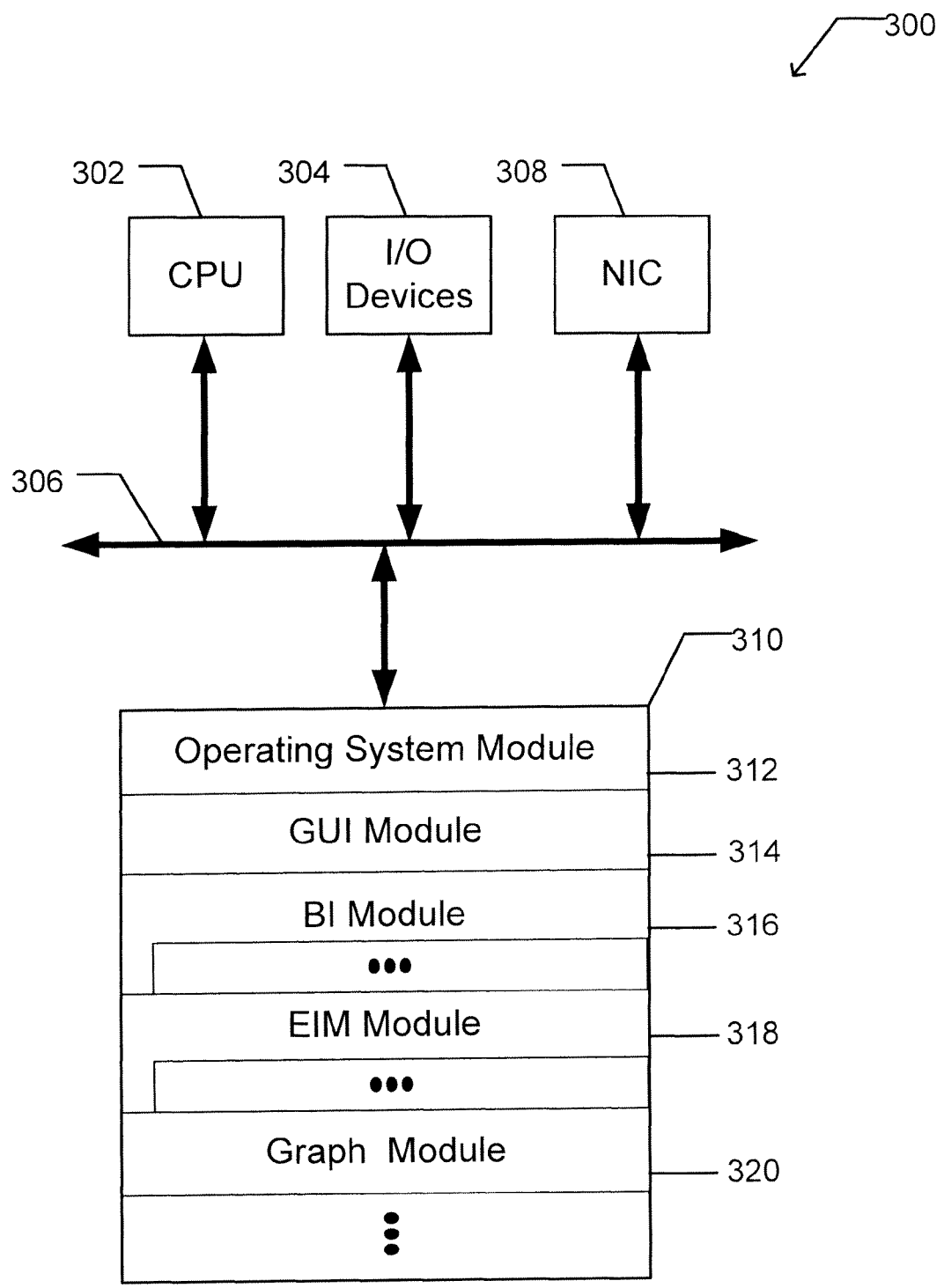
FIG. 3 illustrates a computer constructed in accordance with an embodiment of the invention.

FIG. 3 illustrates a computer 300 configured in accordance with an embodiment of the invention. The computer 300 includes standard components, including a central processing unit (CPU) 302 and input/output devices 304, which are linked by a bus 306. The input/output devices 304 may include a keyboard, mouse, touch screen, monitor, printer, and the like. A network interface circuit 308 is also connected to the bus 306. The network interface circuit 308 provides connectivity to a network (not shown), thereby allowing the computer 300 to operate in a networked environment.

Also connected to the bus 306 is a memory 310. The memory 310 stores executable instructions to implement operations of the invention. In an embodiment, the memory 310 stores one or more of the following modules: an operating system module 312, a graphical user interface (GUI) module 314, an extended memory addressing module 314, a BI module 316, an EIM module 318 and a graph module 320.

The operating system module 312 may include instructions for handling various system services, such as file services or for performing hardware dependant tasks. The GUI module 314 may rely upon standard techniques to produce graphical components of a user interface, e.g., windows, icons, buttons, menu and the like, examples of which are discussed below. The BI module 316 includes executable instructions to perform BI related functions, such as, generate, view or share reports, perform queries and analyses, and the like. In an embodiment, the BI module 316 includes a dedicated report sub-module.

The EIM module 318 includes executable instructions for maintaining and managing data quality. The executable instructions include instructions to integrate data from different source, detect defects in data, profile defects in data, correct defects in data, and manage metadata associated with the data. In an embodiment, the EIM module 318 includes a dedicated data quality sub-module. The data quality sub-module includes executable instructions to detect defects in data, optionally to correct the defects, and display reports on the data's defects.

The graph module 320 includes executable instructions to create, store, and manipulate graphs. The graph module 320 includes executable instructions to render graphs such that the graphs can be displayed by the GUI module 314.

The executable modules stored in memory 310 are exemplary. It should be appreciated that the functions of the modules maybe combined. In addition, the functions of the modules need not be performed on a single machine. Instead, the functions may be distributed across a network, if desired. Indeed, the invention is commonly implemented in a client-server environment with various components being implemented at the client-side and/or the server-side. It is the functions of the invention that are significant, not where they are performed or the specific manner in which they are performed.

Figure 4:
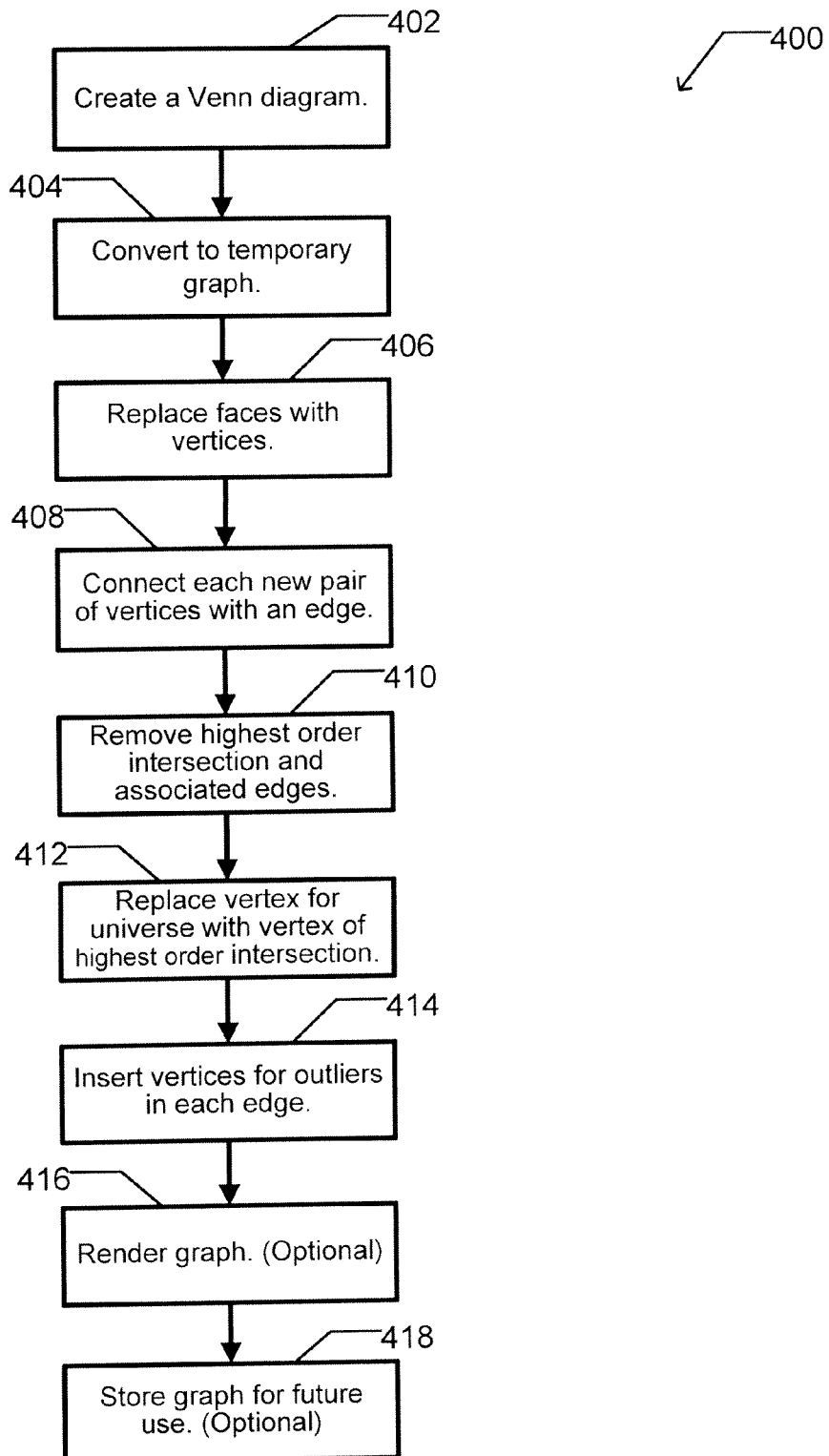
FIG. 4 illustrates processing operations associated with an embodiment of the invention.

FIG. 4 illustrates a set of processing operations 400 that computer 100 implements while executing instructions from the graph module 320. The processing operations 400 create a graph that can display information regarding the interrelationship of two or more sets. The application (e.g., EIM tool or BI tool stored in module 316) creates a Venn diagram with a predetermined (e.g., user determined) number of sets 402. The Venn diagram is converted to a temporary graph 404. The conversion to a temporary graph includes replacing the intersections of set boundaries in Venn diagram with vertices. The faces in the temporary graph are replaced with vertices 406. A face is a region bounded by edges, including the outer infinitely-large region representing the universe. Each new pair of vertices is connected by inserting an edge that crosses an edge in the temporary graph 408. Processing operations 402 through 408 construct a dual graph of a Venn diagram in accordance with the prior art.

In an embodiment of the invention, the set of processing operations from operation 410 on correspond to executable instructions from the data quality module 318 and the graph module 320. The vertex corresponding to the highest order intersection and all edges incident upon it are removed 410. In an embodiment where the Venn diagam models three sets (i.e., A, B and C) the highest order intersection is the intersection of the three sets (i.e., A∩B∩C). The edges incident on a vertex are those edges which have the vertex as a termini. The vertex representing the universe is replaced with the vertex corresponding to the highest order intersection 412.

Vertices corresponding to outliers are inserted in each edge of the graph 414. That is, between each pair of vertices, respectively representing a set and an intersection, a vertex is inserted into the edge between the two existing vertices. These outlier vertices represent the members of the set not in the intersection. For example, the outliers to the intersection of sets A and B (i.e., A∩B) are denoted A⊂(A∩B) as is disposed in the edge between the vertex representing intersection A∩B and set A. In an embodiment where the Venn diagram models three sets (i.e., A, B and C) the complete list of outliers is: A⊂(A∩B); B⊂(A∩B); B⊂(B∩C); C⊂(B∩C); C⊂(C∩A); A⊂(C∩); A⊂(A∩B∩C); B⊂(A∩B∩C); and C⊂(A∩B∩C).

The new graph with or without outliers included is a Venn graph. A Venn graph can be rendered such that it can be easily displayed (e.g., embedded in a plane, given a rectilinear layout, colored) 416. The new graph is stored for future use 418.

Figure 5:
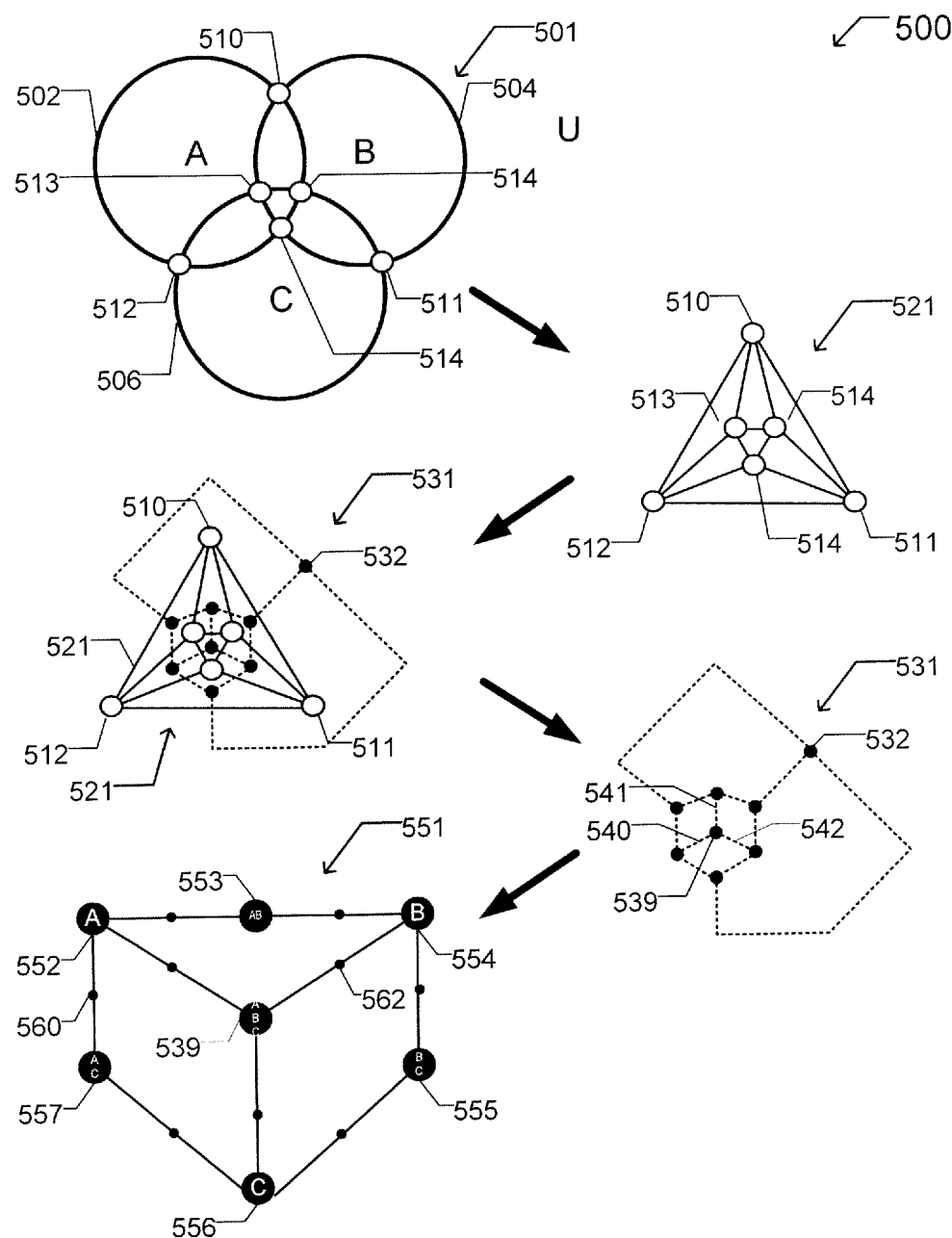
FIG. 5 illustrates a process for creating a graph from a Venn diagram in accordance with an embodiment of the invention.

FIG. 5 illustrates a process for creating a graph from a Venn diagram in accordance with an embodiment of the invention. The process 500 is an example of the processing operations from FIG. 4. The process begins with a Venn diagram 501 with three sets (i.e., A, B and C) 502, 504 and 506. There are second order intersections disposed between each of these sets. The highest order intersection is the intersection of the three sets (i.e., A∩B∩C) in the center of the Venn diagram 501. The intersections of set boundaries in Venn diagram 501 are replaced with vertices 510 through 514. The set boundaries are straightened into edges to create the temporary graph 521.

The dual graph 531 is created from the temporary graph 521 by processing operations 406 and 408 from FIG. 4. A vertex is placed in each face of the temporary graph 521. The faces of the temporary graph 521 include an outer face into which vertex 532 is placed. For each edge in the temporary graph 521, a new edge is added to the dual graph 531. Each of these new edges connects two vertices in the dual graph 531 that correspond to two faces in temporary graph 521 that share an edge. Further, the new edges in the dual graph 531 are drawn so that they cross only one edge in the temporary graph 521 and only cross it once.

The edges of the temporary graph 521 are illustrated with solid black. The vertices of the temporary graph 521 are indicated with white dots with black borders. The vertices of the dual graph 531 are solid black. The edges of the dual graph 531 are dashed black lines.

The dual graph 531 is further modified in accordance with processing operations 410, 412 and 414 from FIG. 4. The vertex corresponding to the highest order intersection 539 and the edges 540, 541 and 542 that are incident upon it are removed. The vertex representing the universe 532 is replaced with the vertex corresponding to the highest order intersection 539. The graph 531 is reshaped such that vertex 539 is in the center. Vertex 539 is connected by an edge to each of vertices 552, 554 and 556 representing sets 502, 504 and 506 respectively. Vertices corresponding to outliers are inserted in each edge of the graph 531 to create graph 551.

The resulting graph 551 includes:

(i) vertices 552, 554 and 556 representing the original sets A, B and C, respectively;

(ii) vertices representing the intersections of sets of various orders (i.e., vertices 553, 555 and 557 representing the intersections of second order and vertex 539 representing the intersection of third order); and (iii) vertices corresponding to outliers disposed between each vertex representing an original set and an intersection (e.g., 560).

As well, the vertex 539 representing the intersection of highest order is coupled to the vertices 552, 554 and 556 representing the original sets by edges interrupted only by vertices corresponding to outliers. For example, vertex 562 couples vertex 539 to vertex 554. Vertex 562 represents the outliers between set B and intersection A∩B∩C denoted B⊂(A∩B#C).

The conversion of Venn diagram 501 to graph 551 has the following isomorphisms:

| Venn Diagram 501 | Graph 551 |
|---|---|
| set 502, A | vertex 552 |
| set 504, B | vertex 554 |
| set 506, C | vertex 556 |
| intersection A∩B | vertex 553 |
| intersection B∩C | vertex 555 |
| intersection A∩C | vertex 557 |
| intersection A∩B∩C | Vertex 539 attached to vertices 552, 554 and 556. |
| Set boundaries. | Othogonal edges to set boundaries connecting vertices. |

These isomorphisms are different from those relating FIGS. 1 and 2.

Figure 6:
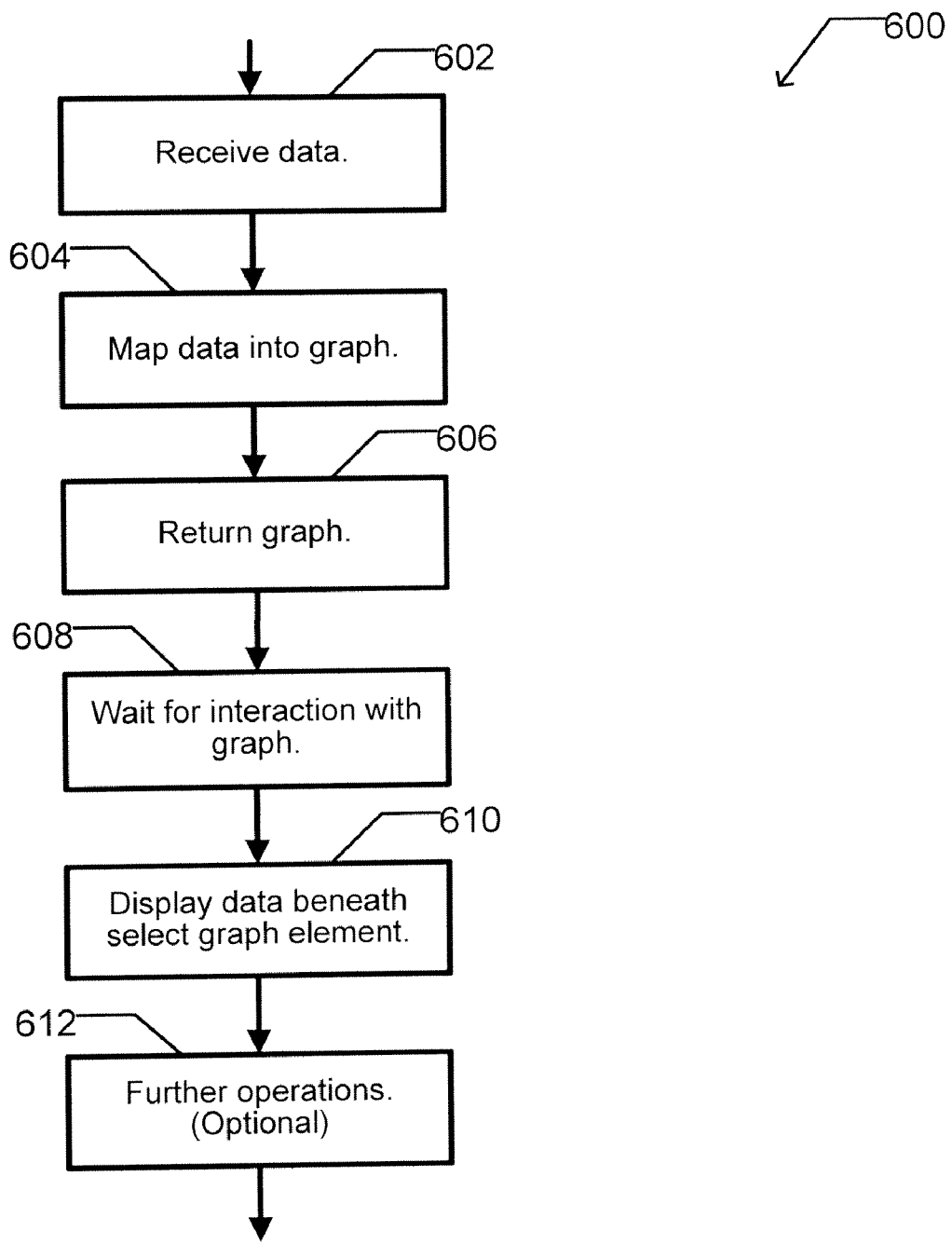
FIG. 6 illustrates processing operations associated with an embodiment of the invention.

FIG. 6 illustrates a set of processing operations 600 that computer 100 implements while executing instructions from the graph module 320. The processing operations 600 map data into a graph that can display information regarding the interrelationship of two or more sets within the data. Data is received 602. In operation 604, the data is mapped into an appropriate graph stored in the graph module 320. The various sets within sets are mapped to vertices as are the various intersections and outliers to these sets. The graph is returned 606. In an embodiment, this includes displaying the graph on an output device of computer 100. Computer 100, or the like, waits for an interaction with the graph and responds appropriately 608. In an embodiment, the interaction is with a user via a user interface. In an embodiment, the interaction is with another computer program. The interaction can include manipulating the appearance of the graph. The interaction can include selecting an element of the graph to retrieve the data it represents. The data beneath the graph element (e.g., vertex) is displayed 610. Further operations can occur such as user interaction with the data 612. Alternative processing operations can continue from operation 612 or the processing can continue from operation 608.

In an embodiment, the data mapped to a Venn graph in processing operations 600 relate to an EIM task. An EIM task is a redundancy profile on two or more columns of a same or different data source. Performing redundancy profiles on multiple columns can determine if the columns are redundant. Venn diagrams, and graphs derived from them, are used to compare attributes and characteristics of items, such as names, numbers, and dates. The results from an EIM task are received 602. In operation 604, the results from the EIM module are mapped into an appropriate graph stored in the graph module 320.

Figure 7:
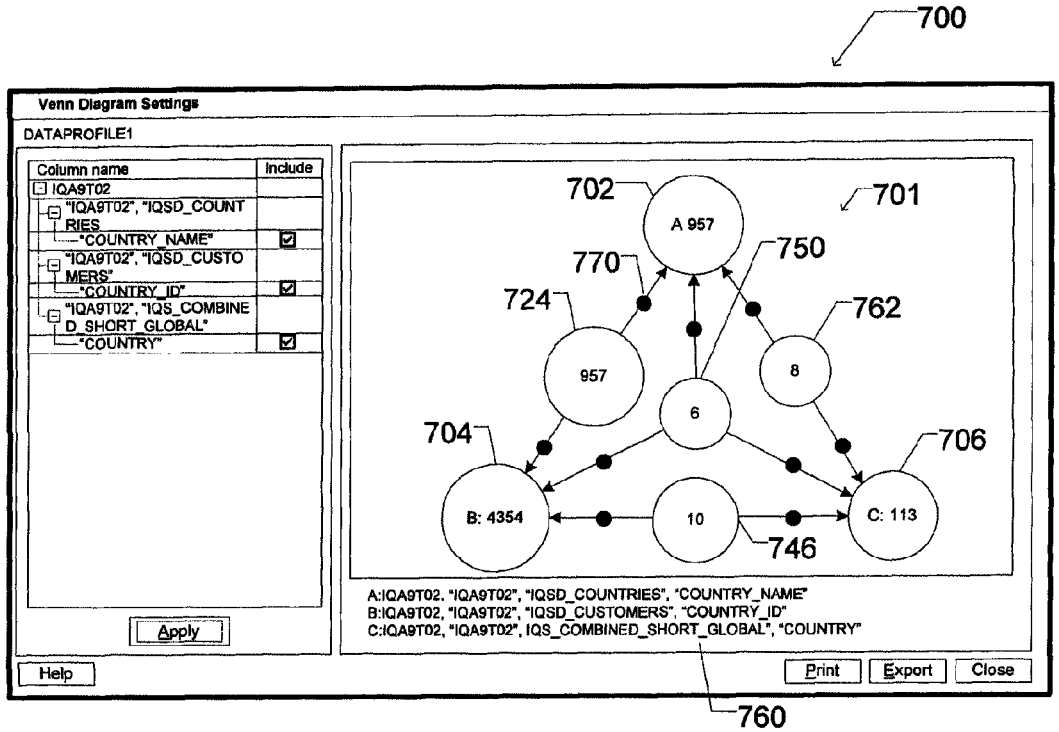
FIG. 7 illustrates a graphical user interface including a graph associated with an embodiment of the invention.

FIG. 7 displays within a GUI 700 a graph 701 constructed from a Venn diagram displaying data in accordance with an embodiment of the present invention. In the embodiment shown in FIG. 7, the data is from an EIM task. The legend 760 at the bottom of GUI 700 lists the tables and column names for each of the vertices. Each of the vertices 702, 704 and 706 represents a data set. In GUI 700 a data set is a column. In an embodiment, a number inside the vertices indicates the number of distinct values for that set. In an embodiment, the size of the visual elements representing the vertices is proportional to the number of distinct values the vertices represents. In an embodiment, the set with the most members has the largest vertex and the remaining vertices are smaller with their sizes proportional to their location in the order of set sizes. That is the third largest set has the third largest vertex.

The graph 701 shows how sets overlap. The vertex 724 represents the intersection of the sets represented by vertices 702 and 704. The vertex 746 represents the intersection of the sets represented by vertices 704 and 706. The vertex 762 represents the intersection of the sets represented by vertices 706 and 702. The vertex 750 represents the intersection of the sets represented by vertices 702, 704 and 706. The vertices inline with the edges (e.g., 770) represents the outliers. In an embodiment, the outliers are represented by an edge, but as vertices are easier to click on using a pointing device it is believed that vertices afford better access to the outlier data. In an embodiment, a vertex representing the universe is included in GUI 700.

Figure 8:
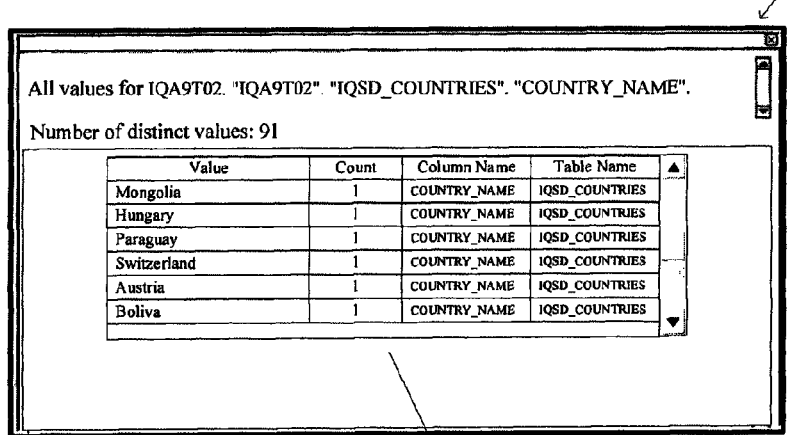
FIG. 8 illustrates a graphical user interface including a Venn graph in accordance with an embodiment of the invention.

FIG. 8 displays within a GUI 800 data represented by a vertex in the graph displayed in GUI 700. By selecting a vertex, the user or program can retrieve the set (e.g., column) or a portion thereof. When the action is performed by a user it is called a drill-down operation. GUI 800 shows an example of the drill-down window which provides detailed information about the set. Here the set is a column in a relational database. The number of occurrences of a value, the column, table and database names are shown. The user can interact with the table 802 shown in GUI 800.

Figures 9, 10, 11:
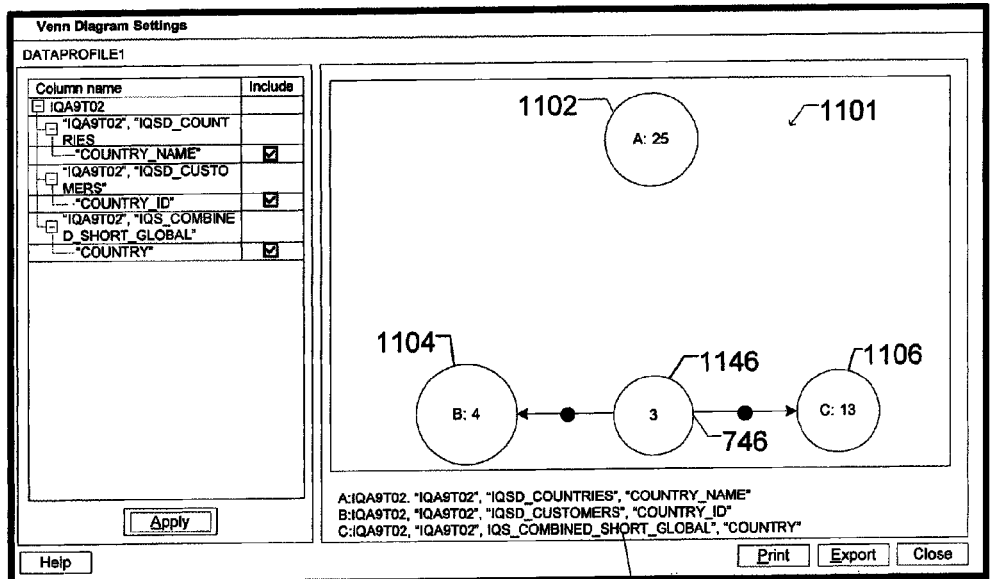
FIGS. 9 and 10 each illustrates a graphical user interface including a table associated with an element of the graph of FIG. 8, in accordance with an embodiment of the invention.
FIG. 11 illustrates the graphical user interface of FIG. 8 and another Venn graph depicted in accordance with an embodiment of the invention.

FIG. 9 displays with in a GUI 900 data represented by vertex 724 in the graph displayed in GUI 700. By clicking on vertex 724, the executable instructions in the GUI module 314, graph module 320 and EIM module 318 display a window in GUI 900 showing the data that is shared between the sets represented by vertex 702 and vertex 704 of FIG. 7. The user can interact with the table 902 shown in GUI 900. By clicking on vertex 750 the user can view the duplicate information stored in all three sets under vertices 702, 704 and 706. This data is shown in a table similar to table 902 of GUI 900 of FIG. 9. By clicking on vertex 770, in this example a small black dot, the user can view the outliers between vertex 702 and vertex 724. This data is shown in table 1002 in GUI 1000 of FIG. 10. This is the data under vertex 702 not under vertex 724.

FIG. 11 displays within a GUI 1100 a graph 1101 constructed from a Venn diagram displaying data in accordance with an embodiment of the present invention. The legend 1160 at the bottom GUI 1100 lists the tables and column names for each of the vertices. Each of the vertices 1102, 1104 and 1106 represents a data set. The graph 1101 shows how sets overlap. In accordance with an embodiment, there are no edges between the vertices which do not overlap. That is, there is no commonality between the columns they represent. There is no overlap in the data under 1102 and 1104. Likewise, there is no overlap in the data under 1102 and 1106. Unlike, graph 701 in GUI 700, no third order intersection is shown in graph 1101 as there is no data common to three sets. A second order intersection 1146 is shown.

Figure 12:
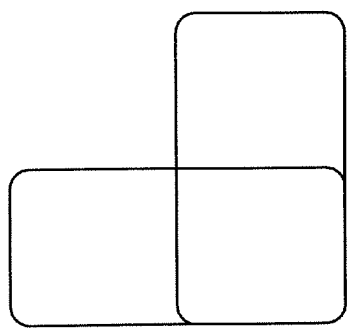
Figure 13:
Figure 14:
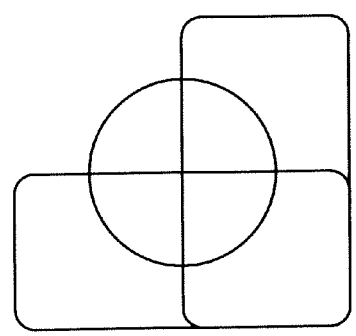
Figure 15:
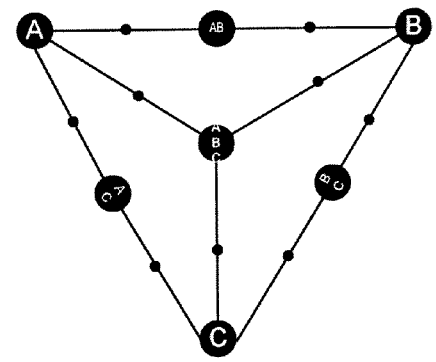

FIGS. 12, 14 and 16 illustrate Venn diagrams for visualizing the relationship between sets in accordance with the prior art. These Venn diagrams are Edwards-Venn diagrams corresponding to circles applied to a sphere and mapped to a plane. Edwards-Venn diagrams are used to draw Venn diagrams for any number of sets. The Venn diagram from FIG. 12 can be converted to the graph in FIG. 13 via process operations 400 of FIG. 4. The Venn diagram from FIG. 14 can be converted to the graph in FIG. 15 via process operations 400 of FIG. 4 as illustrated in FIG. 5. The Venn diagram from FIG. 16 can be converted to the graph in FIG. 17 via process operations 400 of FIG. 4.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium, comprising executable instructions to:
   associate two or more data sets with two or more vertices in a Venn graph;
   associate an intersection of the two or more data sets with a vertex in the Venn graph; and
   associate a plurality of outliers between the two or more data sets and the intersection of the two or more data sets with a plurality of vertices disposed between the two or more vertices and the vertex in the Venn graph, wherein the plurality of outliers includes members of the two or more data sets that are not in the intersection of the two or more data sets.

2. The non-transitory computer readable storage medium of claim 1 wherein the two or more data sets are results from an enterprise information management task.

3. The non-transitory computer readable storage medium of claim 1 further comprising executable instructions to remove an edge from the Venn graph to reflect the absence of overlap between two sets.

4. The non-transitory computer readable storage medium of claim 1 further comprising executable instructions to display the Venn graph.

5. The non-transitory computer readable storage medium of claim 1 wherein the Venn graph displays the overlap of the two or more sets.

6. The non-transitory computer readable storage medium of claim 5 further comprising executable instructions to:
   determine the intersection of the two or more data sets; and
   determine the plurality of outliers between the two or more data sets and the intersection of the two or more data sets.

7. The non-transitory computer readable storage medium of claim 1 further comprising executable instructions to receive a selection of an element of the Venn graph and return a portion of the two or more data sets.

8. The non-transitory computer readable storage medium of claim 1 further comprising executable instructions to:
   convert the Venn diagram into a temporary graph;
   create a dual graph from the temporary graph;
   remove a first vertex and a set of edges incident upon the first vertex from the dual graph, wherein the first vertex corresponds to the highest order intersection of the Venn diagram; and replace a second vertex with the first vertex to create a new graph, wherein the second vertex represents the universe of the Venn diagram.

9. The non-transitory computer readable storage medium of claim 8 further comprising executable instructions to insert a plurality of vertices corresponding to outliers, wherein a vertex from the plurality of vertices is inserted into each edge of the new graph.

10. The non-transitory computer readable storage medium of claim 9 wherein the plurality of vertices corresponding to outliers are disposed between:
   a) one or more vertices corresponding to:
      i) the highest order intersection of the Venn diagram, or
      ii) the highest order intersection of the Venn diagram and the lesser order intersections of the Venn diagram; and
   b) a plurality of vertices corresponding to the sets of the Venn diagram.

11. The non-transitory computer readable storage medium of claim 8 further comprising executable instructions to display the new graph.

12. The non-transitory computer readable storage medium of claim 11 further comprising executable instructions selected from executable instructions to: embed the new graph in a plane, give the new graph a rectilinear layout and color the new graph.

13. The non-transitory computer readable storage medium of claim 8 further comprising executable instructions to store the new graph.

14. A non-transitory computer readable storage medium, comprising executable instructions to:
   define a first plurality of vertices representing three or more data sets;
   form a vertex representing an intersection of the three or more data sets, wherein the intersection is of a known integer order;
   establish a second plurality of vertices representing intersections of one or more orders between second order and one less than the known integer order;
   derive a first plurality of edges incident on the vertex representing an intersection of the three or more data sets, where the first plurality of edges couple the vertex representing the intersection of the three or more data sets to the first plurality of vertices;
   identify a second plurality of edges incident on vertices of the first plurality of vertices and coupling the vertices of the first plurality of vertices to vertices of the second plurality of vertices;
   draw a third plurality of vertices corresponding to outliers, wherein each vertex in the third plurality of vertices is disposed between each vertex representing an original set and an intersection;
   assemble all vertices and edges to form a graph; and
   display the graph.

15. The non-transitory computer readable storage medium of claim 14 wherein the executable instructions define a planar graph.

16. The non-transitory computer readable storage medium of claim 14 wherein the known integer order is selected from 3, 4 and 5.

17. The non-transitory computer readable storage medium of claim 14 wherein the executable instructions define a Venn graph.

18. The non-transitory computer readable storage medium of claim 17 further comprising executable instructions to map data from a Venn diagram into the Venn graph.

19. The non-transitory computer readable storage medium of claim 14 wherein a designated vertex is selected from the vertex representing the intersection of the three or more data sets, the first plurality of vertices, the second plurality of vertices and the third plurality of vertices, wherein the designated vertex includes an indication of the number of values in the designated vertex, and wherein the indication includes sizing the visual elements representing the designated vertex to be proportional to the number of values the designated vertex represents.

* * * * *